J. J. HOOKER.

Improvement in Timber Splice for Bridges.

No. 132,287. Patented Oct. 15, 1872.

Witnesses:
Jas. E. Hutchinson
C. L. Evert

Inventor.
John J. Hooker.
per Alexander Mason
Attorneys.

UNITED STATES PATENT OFFICE.

JOHN J. HOOKER, OF OWEGO, NEW YORK.

IMPROVEMENT IN TIMBER-SPLICES FOR BRIDGES.

Specification forming part of Letters Patent No. 132,287, dated October 15, 1872.

*To all whom it may concern:*

Be it known that I, JOHN J. HOOKER, of Owego, in the county of Tioga and in the State of New York, have invented certain new and useful Improvements in Splicing Bridge-Timbers; and do hereby declare that the following is a full, clear, and exact description thereof, reference being had to the accompanying drawing and to the letters of reference marked thereon making a part of this specification.

The nature of my invention consists in the construction and arrangement of "cast-iron clamps," to be used in splicing bridge-timbers, as will be hereinafter more fully set forth.

In order to enable others skilled in the art to which my invention appertains to make and use the same, I will now proceed to describe its construction and operation, referring to the annexed drawing, in which—

Figure 1:
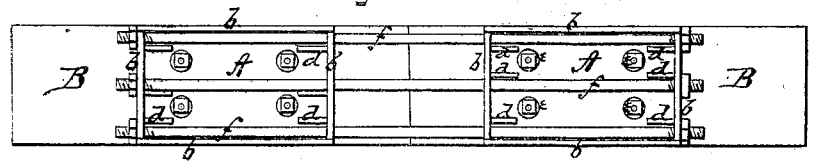
Figure 2:
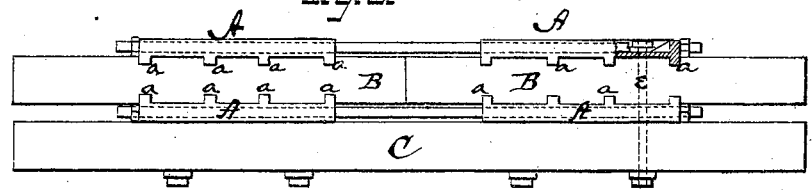
Figure 3:
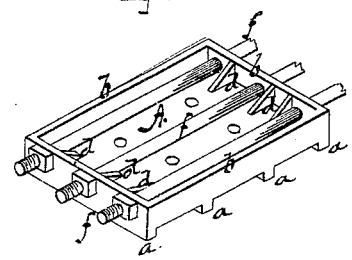

Figure 1 is a plan view, and Fig. 2 a side view, showing my clamps as used for splicing bridge-chords; Fig. 3 is a perspective view of the cast-iron clamp.

My clamp may be used for truss-girders and beams as well as for chords, or, in fact, wherever timber is to be lengthened by a splice. It consists of a plate, A, of any desired dimensions, provided with a series of transverse ribs, $a\ a$, on one side, and on the other side it has flanges $b\ b$ projecting around the edges of the plate. The flanges $b$ at the ends of the plate are strengthened by inward-projecting inclined flanges $d\ d$, the entire plate, with ribs and flanges, being cast in one piece. B B represent the two timbers, which are to be joined together. In opposite sides of these timbers are made suitable grooves for the insertion of the ribs $a\ a$.

The clamps being placed in position on opposite sides of the timber, bolts $e\ e$ are passed through each timber B and its two clamps, and also through another timber, C, arranged, as usual, to break joints. Nuts are placed on the ends of said bolts $e\ e$ to tighten the parts firmly together. Rods $f\ f$ are then passed lengthwise of the clamps through the end flanges $b\ b$, connecting the two clamps on each side of the two timbers, and fastened by nuts on the ends, thus completing the splice.

This clamp makes a very strong splice without cutting the timber to reduce the strength at any point. It costs less than the usual clamp, does not look as clumsy as the wooden splice, preserves the timber better, and draws the joint tight in all cases, even if the framing should not be quite perfect.

Having thus fully described my invention, what I claim as new, and desire to secure by Letters Patent, is—

The clamp-plate A, provided with ribs $a\ a$ and flanges $b\ b$ and $d\ d$, all cast in one piece, and used in combination with the bolts $f\ f$, substantially as and for the purposes set forth.

In testimony that I claim the foregoing I have hereunto set my hand this 17th day of July, 1872.

JOHN J. HOOKER.

Witnesses:
T. C. PLATT,
W. SMYTH.